United States Patent [19]

Marjollet et al.

[11] 4,200,443
[45] Apr. 29, 1980

[54] VERTICAL SEPARATOR FOR SEPARATING A MIXTURE OF FLUID PHASES

[75] Inventors: Jacques Marjollet, Paris; Gerard Tondeur, Velizy Villacoublay; Jean-Pierre Cerdan, Houilles; Patrick Talleu, Chatou, all of France

[73] Assignee: Stein Industrie, Paris, France

[21] Appl. No.: 955,237

[22] Filed: Oct. 27, 1978

[30] Foreign Application Priority Data

Nov. 30, 1977 [FR] France ............................... 77 36095

[51] Int. Cl.² ............................................. B01D 45/12
[52] U.S. Cl. ........................................ 55/347; 55/413
[58] Field of Search ................. 55/202, 319, 337, 345, 55/346, 347, 348, 413, 448, 456, 457; 122/34, 488, 489, 491, 492

[56] References Cited

U.S. PATENT DOCUMENTS

| | | | |
|---|---|---|---|
| 1,338,143 | 4/1920 | McGee | 55/348 |
| 3,324,634 | 6/1967 | Brahler et al. | 55/337 |
| 3,331,194 | 7/1967 | Reed et al. | 55/413 |
| 3,541,766 | 11/1970 | Wilson | 55/319 |
| 3,769,781 | 11/1973 | Klein et al. | 55/457 |

*Primary Examiner*—David L. Lacey
*Attorney, Agent, or Firm*—Haseltine, Lake & Waters

[57] ABSTRACT

A vertical separator for separating the liquid and vapor phases of a fluid. The separator includes an outer casing having an inlet chamber for the vapor-mixture and vertical tubes provided at their inlets with fixed vanes which cause the mixture to flow helically. Coaxial tubes at their outputs, of smaller diameter enable dry vapor to be removed. A mixture with an increased liquid content is caused to be removed through the annular spaces, between the coaxial tubes. The annular spaces communicating with a free space in which said mixture with increased liquid content is separated into dry vapor and a liquid which still contains some vapor, and said inner tubes communicating with a dry vapor collecting chamber. An annular edge allows the vapor which is still contained in the liquid to escape upwardly through an annular peripheral passage between said annular edge and the outer casing.

5 Claims, 2 Drawing Figures

LEVEL CONTROL DEVICE

VERTICAL SEPARATOR FOR SEPARATING A MIXTURE OF FLUID PHASES

FIELD OF THE INVENTION

The present invention relates to a vertical separator for separating the liquid and vapor phases of a fluid said separator including, inside an outer casing, an inlet chamber for the vapor-liquid mixture, a plurality of vertical tubes provided at their inlets with fixed vanes which make the mixture flow helically and, at their outputs with coaxial tubes of smaller diameter through which dry vapor is removed, a mixture with increased liquid content being removed through the annular spaces between the coaxial tubes, said annular spaces communicating with a free space which allows the separation of said mixture with increased liquid content into substantially dry vapor and a liquid which still contains some vapor, and said inner tubes of smaller diameter communicating with a dry vapor collecting chamber.

It applies in particular to separators for separating wet steam into dry steam and residual water, in particular for electricity power stations.

BACKGROUND OF THE INVENTION

Steam separation driers using the centrifuge effect in tubes have the advantage of small bulk in relation to the flow of steam to be treated and can therefore be disposed in steam flows directly at the output of the moisture generating devices such as expansion turbines thereby dispensing with, or reducing, lengths of piping for conveying wet steam.

Such piping is subjected to erosion-corrosion phenomena and clearly a reduction in its length is desirable. These driers produce dry steam with a low residual water content of about 0..1% and consequently reduce to a minimum, the volume of water retained in the steam circuits, which water is liable to become vaporized during steam pressure drops thereby lowering the temperature of the steam and reducing its thermodynamic efficiency. However, the separated water is still mixed with steam and even if it is introduced into a chamber which allows separation by gravity, separation is incomplete. The water which trickles down still withdraws a quantity of steam which is lost from the thermodynamic cycle. This reduces the efficiency of the downstream equipment (expansion turbines, heat exchangers). The steam which rises in this chamber still contains droplets of water; it is therefore difficult to use without danger, in particular of corrosion, unless expensive stainless steel tubing is used.

The present invention aims to remedy the above drawbacks and to provide a vertical separator which is capable of producing firstly dry steam with a low residual water content and secondly an extra fraction of steam from which the maximum of residual water has been removed and which contains only a few percent of water, which steam can be used in thermodynamic circuits without causing appreciable erosion-corrosion in the tubing. The invention is applicable to fluids other than $H_2O$.

SUMMARY OF THE INVENTION

The vertical separator according to the invention further includes an annular edge which allows the vapor which is still contained in the liquid to escape upwards through an annular peripheral passage between said annular edge and the outer casing.

Preferentially, it also has at least one of the following characteristics:
- said annular peripheral passage includes at least one sudden increase in the cross-section and, downstream therefrom, means for collecting the liquid which gathers subsequent to the sudden expansion of the wet vapor as it passes through the sudden increase in diameter.
- it includes a horizontal perforated plate disposed on the top of the cylindrical casing and which forms a spaced member for the vertical tubes of greater diameter.
- the coaxial tubes of smaller diameter are fixed to a lower perforated disc which is itself integral with the dry steam collecting chamber, and is supported by brackets fixed to the outer casing.
- it includes a receptacle for collecting the separated liquid, said receptacle being integral with the inside of the casing.

BRIEF DESCRIPTION OF THE DRAWINGS

The invention is described hereinbelow in greater detail by means of two examples and with reference to the figures of the accompanying drawing, in which.

DETAILED DESCRIPTION

Figure 1:
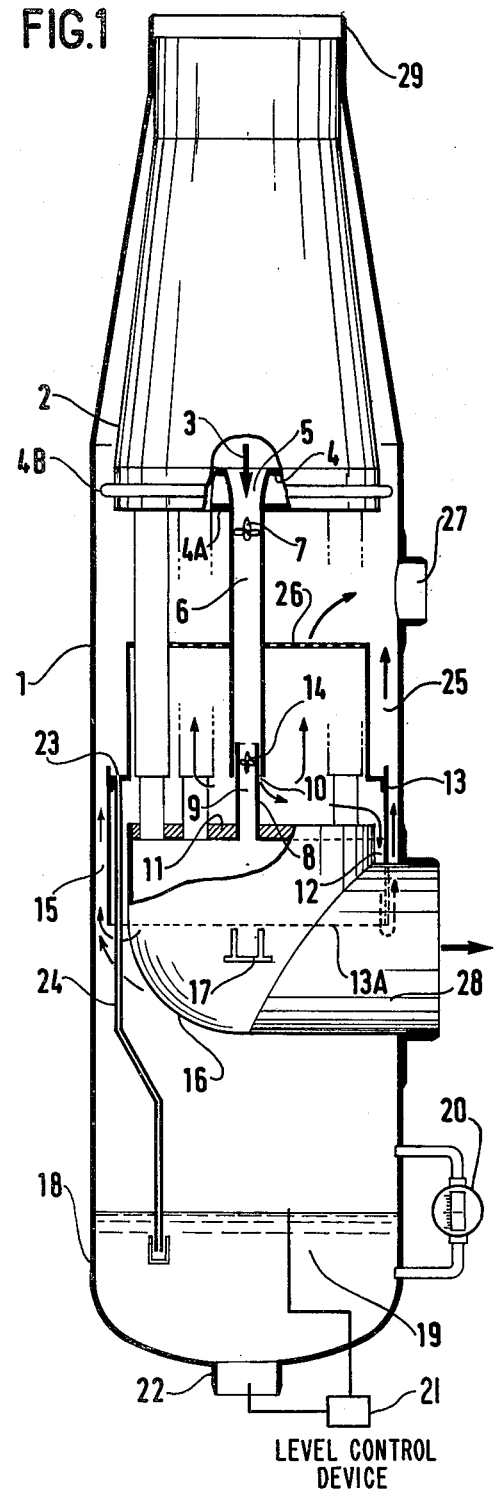
FIG. 1 is a partially cut-away elevation of a separator in accordance with the invention.

In FIG. 1, the separator includes an outer casing 1 to which is welded at its tubular upper portion a sleeve 2 enclosing an inlet chamber for access to separator tubes 6, said sleeve being firstly cylindrical then conical. Steam, containing for example 10% water, enters the separator tubes 6 at the top and flows downwards in the direction of arrow 3. The access openings are constituted by stamped inlet adaptors the inlet openings of which in inlet disc 4 are hexagonal but become circular to match the cross-sections of tubes at a second perforated disc 4A. The tubes only one of which is shown in cross-section are provided with fixed vanes 7 at their inputs to make the wet steam move in a helical flow. Tubes 8 of slightly smaller diameter than the tubes 6 are engaged in the lower ends of the tubes 6. The helical flow of the wet steam forms a deposit of droplets of water on the inner wall of the tube 6, which droplets trickle downwards along the wall. The dry steam which remains in the central zone of the tube is removed through the inner passages 9 of the tubes 8 which lead through an perforated disc 11 to a dry steam collecting chamber 16. The separated water mixed with steam is removed through an annular space 10 between the tubes 6 and 8. At the outlet of the annular space, the mixture of water and steam, which contains for example 50% steam, undergoes further separation, the water flowing towards the periphery on the perforated disc 11, while the steam escapes upwards, as shown by the vertical arrows. The water then flows downwards into an annular space 12 between a cylindrical casing 13 fixed to the outside of the dry steam collecting chamber 16 by means which are not shown. When it reaches the lower edge 13A of the casing 13, the water is again separated from any residual steam which it still contains. While the water flows by gravity towards the bottom 18 of the outer casing 1 to form a bath 19 there, the steam rises into an annular space 15 between the outer casing 1 and the casing 13. At the level of a shoulder 23 of the casing 13, the cross-section of the annular space 15 is suddenly increased. This sudden increase in cross-section causes the flowing mixture of steam and droplets to expand suddenly. A great proportion of the water is collected at 23 and removed through tubes such as 24 towards the bath 19. The remaining steam rises through the chamber 25 and mixes with the steam separated out above the perforated disc 11 (and whose relative flow is regulated by a perforated grating 26) and the two flows of steam are removed together through a side pipe 27, towards a load, the steam having a moisture content of a few percent.

The dry steam separated inside the tubes 8, has a residual moisture content of about 0.1%. Its helical flow is cancelled by fixed vanes 14. The giratory direction of the vanes 14 is the opposite of that of the vanes 7. The steam collects in the dry steam chamber 16 and is conveyed to a load through a side tube 28. The inner structures rest by means of the chamber 16 on side supports or brackets 17, which are shown more clearly in FIG. 2.

The water collected in the bottom 18 of the casing 1 constitutes therein a bath 19 whose level is regulated by a level control device 21 associated with a water gauge 20. The level control device 21 controls a valve (not shown) disposed on the outlet pipe connected to a tube 22, so as to keep the level of the bath 19 constant.

The thermal expansion of the inner part of the separator are absorbed by expansion bellows 4B disposed between the perforated discs 4 and 4A.

Figure 2:
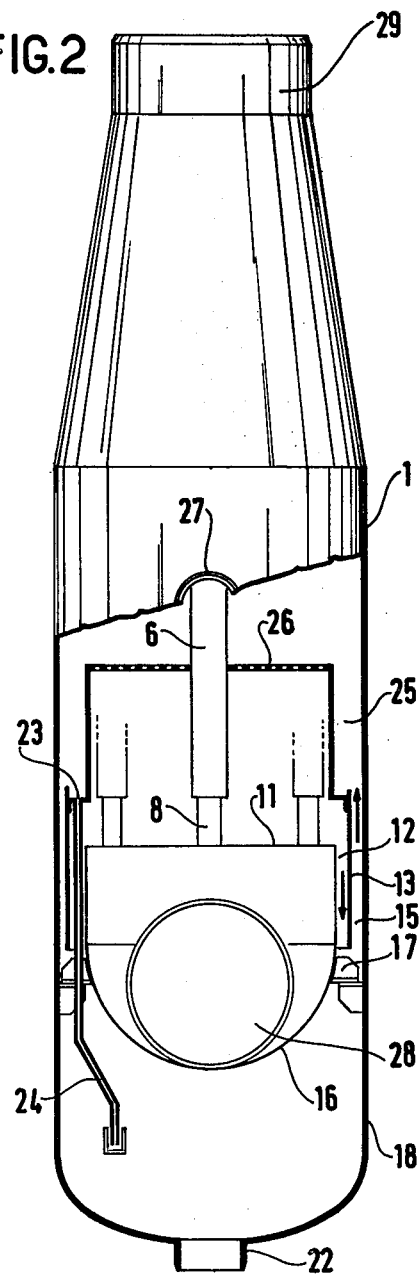
FIG. 2 is an elevation of a variant of the separator of FIG. 1, with the lower part of the outer casing cutaway.

The separator shown in FIG. 2 is mainly identical to that in FIG. 1 and the common components will therefore not be described again. Further, the view thereof is not a front view, as in FIG. 1, but a side view, (showing the right-hand side of the separator in FIG. 1). However, it does not have a bottom for collecting a liquid bath, so that it is not so tall. The water separator is removed directly through the tube 22 towards a condensate tank.

The arrangement for removing the residual moisture by a sudden increase in the cross-section of the flow in the annular space can be replaced by another such as baffle plates which would provide the same result. The annular space can include several devices for removing the residual moisture at successive levels.

It should be understood that, although the invention has been particularly described in relation to the use of $H_2O$ as the fluid to be separated into liquid and vapor phases, the invention is equally applicable to other fluids, and indeed fluids other than $H_2O$ are being used increasingly as working fluids in certain special circumstances.

We claim:

1. A vertical separator for separating respective liquid and vapor phases of a fluid mixture, said separator including: an outer casing, said outer casing having disposed therein, an upper sleeve enclosing an inlet chamber for the fluid mixture, a plurality of vertical tubes, said tubes being provided with inlet openings at the top of said tubes, communicating with said inlet chamber, and fixed vanes positioned in said tubes to urge the mixture to flow helically; at the bottom of said coaxial tubes of smaller diameter for the collection of dry steam, fixed on a perforated disc and communicating with a dry steam collection chamber, inside of an inner casing and connected with a dry steam outlet tube, said coaxial tubes having annular spaces between them and the bottom of said vertical tubes for the removal of a fluid mixture with increased liquid content; a cylindrical casing enclosing a free space around said plurality of vertical tubes above said perforated disc, said free space allowing the separation of said fluid mixture with increased liquid content into substantially dry vapor and a liquid still containing some vapor, said cylindrical casing being spaced from the inner side of said outer casing to thereby define an outer annular space, from the periphery of said inner casing of said dry steam collection chamber defining an inner annular space for the downwards flow of said liquid still containing some vapor, and being provided with a lower free edge for allowing the vapor remaining in said liquid still containing some vapor to escape upwardly through said outer annular space, means for withdrawing said substantially dry vapor and said escaped vapor, and means for collecting and withdrawing the liquid stripped from said escaped vapor.

2. A vertical separator according to claim 1, wherein: said cylindrical casing has a lower part of a larger diameter and an upper part of a smaller diameter, said respective parts being separated by a shoulder providing a sudden increase in cross-section of said annular space and said shoulder being provided with means for withdrawing the liquid collected at its level.

3. A vertical separator according to claim 1, including: a horizontal perforated plate at the top of said cylindrical casing defining a spacer member for said vertical tubes.

4. A vertical separator according to claim 1, wherein: the casing of said dry steam collection chamber is provided with fastenings resting on side brackets fixed on the outer casing.

5. A vertical separator according to claims, 1, 2, 3 or 4, wherein: said means for collecting the liquid stripped from said escaped vapor are formed by the lower end of said outer casing under said dry steam collection chamber.

* * * * *

UNITED STATES PATENT AND TRADEMARK OFFICE
CERTIFICATE OF CORRECTION

PATENT NO. : 4,200,443
DATED : April 29, 1980
INVENTOR(S) : Jacques Marjollet et al.

It is certified that error appears in the above—identified patent and that said Letters Patent is hereby corrected as shown below:

On the title page, item (73) should be deleted to read:
-- Assignee: Societe Anonyme dite: Stein Industrie, Villacoublay; and Electricite De France Service National, Paris, both of France --.

Signed and Sealed this

Eleventh Day of November 1980

[SEAL]

Attest:

Attesting Officer

SIDNEY A. DIAMOND

Commissioner of Patents and Trademarks